(12) United States Patent
Orr et al.

(10) Patent No.: US 12,546,405 B2
(45) Date of Patent: Feb. 10, 2026

(54) CHECK VALVE ASSEMBLY

(71) Applicant: Zurn Water, LLC, Milwaukee, WI (US)

(72) Inventors: William M. Orr, Paso Robles, CA (US); Michael Alan Andrew, Monona, WI (US)

(73) Assignee: ZURN WATER, LLC, Milwaukee, WI (US)

( * ) Notice: Subject to any disclaimer, the term of this patent is extended or adjusted under 35 U.S.C. 154(b) by 0 days.

(21) Appl. No.: 18/826,990

(22) Filed: Sep. 6, 2024

(65) Prior Publication Data

US 2025/0075814 A1 Mar. 6, 2025

Related U.S. Application Data

(60) Provisional application No. 63/580,861, filed on Sep. 6, 2023.

(51) Int. Cl.
*F16K 15/06* (2006.01)
(52) U.S. Cl.
CPC .................................. *F16K 15/064* (2021.08)
(58) Field of Classification Search
CPC .. F16K 15/035; F16K 15/064; F16K 2200/30; Y10T 137/7906
See application file for complete search history.

(56) References Cited

U.S. PATENT DOCUMENTS

| | | | |
|---|---|---|---|
| 711,792 A | 10/1902 | Moores et al. | |
| 5,564,467 A * | 10/1996 | Ackroyd | F16K 17/0493 |
| | | | 137/535 |
| 5,584,315 A | 12/1996 | Powell | |
| 5,913,331 A | 6/1999 | Noll et al. | |
| 6,155,291 A | 12/2000 | Powell | |
| 6,220,282 B1 | 4/2001 | Powell | |
| 6,443,181 B1 | 9/2002 | Powell | |
| 6,443,184 B1 * | 9/2002 | Funderburk | F16K 15/066 |
| | | | 137/535 |
| 8,875,733 B2 | 11/2014 | Powell | |

FOREIGN PATENT DOCUMENTS

CN 212616530 U 2/2021
CN 115451165 A 12/2022

OTHER PUBLICATIONS

BAVCO, Model 4000 RP Reduced Pressire Principle Backflow Prevention Assembly Manual, 3 pages.

* cited by examiner

*Primary Examiner* — P. Macade Nichols
(74) *Attorney, Agent, or Firm* — Husch Blackwell LLP

(57) ABSTRACT

A check valve assembly includes a valve frame, a valve poppet, a first torsion spring, and a second torsion spring. The valve frame has an opening. The valve poppet is positionable in the opening. The valve poppet is moveable in a first direction to close the check valve assembly and moveable in a second direction to open the check valve assembly. The first torsion spring biases the valve poppet in the first direction. The second torsion spring biases the valve poppet in the first direction before the valve poppet has traveled a threshold distance. The second torsion spring biases the valve poppet in the second direction after the valve poppet has traveled the threshold distance.

23 Claims, 9 Drawing Sheets

CHECK VALVE ASSEMBLY

CROSS-REFERENCE TO RELATED APPLICATION

This application claims the benefit of U.S. Provisional Patent Application No. 63/580,861 filed Sep. 6, 2023, the entire contents of which is incorporated by reference herein.

FIELD

The present disclosure relates to valve assemblies, and more specifically, to check valve assemblies for a back flow prevention assembly.

SUMMARY

In one independent aspect, the disclosure provides a check valve assembly that includes a valve frame, valve poppet, a first torsion spring, and a second torsion spring. The valve frame has an opening. The valve poppet is positionable in the opening. The valve poppet is moveable in a first direction to close the check valve assembly and moveable in a second direction to open the check valve assembly. The first torsion spring biases the valve poppet in the first direction. The second torsion spring biases the valve poppet in the first direction before the valve poppet has traveled a threshold distance. The second torsion spring biases the valve poppet in the second direction after the valve poppet has traveled the threshold distance.

In some aspects, the valve poppet has a dome-shaped sealing face.

In some aspects, the second torsion spring does not bias the valve poppet with the valve poppet at the threshold distance.

In some aspects, the valve frame includes an elongated guide rail extending in a direction parallel to the first direction and the second direction, the valve poppet slidably coupled to the elongated guide rail.

In some aspects, the check valve assembly includes a plurality of links connecting the valve poppet to the valve frame, the threshold distance dependent on a length of each link.

In some aspects, the first direction is opposite the second direction.

In another independent aspect, the disclosure provides a check valve assembly including a frame, a poppet, a first axle, a first torsion spring, a second axle, a second torsion spring, and a linkage system. The frame has an opening. The opening defines a centerline of the check valve assembly. The poppet is moveable from an open position toward a closed position in a first direction along the centerline. The poppet is moveable from the closed position toward the open position in a second direction along the centerline. The first axle extends transverse to the first direction. The first torsion spring is disposed about the first axle. The second axle extends transverse to the first direction. The second axle is spaced a distance from the first axle. The second torsion spring is disposed about the second axle. The linkage system is moveable with the poppet. The linkage system includes a first link and a second link. The first link is rotatably coupled to the first axle. The second link is rotatably coupled to the second axle. The second link is rotatably coupled to the first link at a connection. Moving the poppet in the second direction toward the open position includes moving the connection arcuately about the first axle and along the second direction.

In some aspects, each of the first direction and the second direction is parallel to the centerline.

In some aspects, each of the first direction and the second direction is transverse to the centerline.

In some aspects, the first axle is fixed relative to the frame.

In some aspects, the second axle is fixed relative to the poppet.

In some aspects, the first link is one of a plurality of first links. The second link is one of a plurality of second links. Each second link is rotatably coupled to a respective first link at a corresponding connection.

In some aspects, a leg of the first torsion spring engages the first link, and a leg of the second torsion spring engages the second link.

In some aspects, the poppet has a dome-shaped sealing face.

In some aspects, the frame includes an elongated guide rail extending in a direction parallel to the first direction and the second direction, the poppet slidably coupled to the elongated guide rail.

In some aspects, the first torsion spring biases the poppet in the first direction. The second torsion spring biases the poppet in the first direction before the poppet has traveled a threshold distance. The second torsion spring biases the poppet in the second direction after the poppet has traveled the threshold distance.

In some aspects, the poppet includes a seal that engages a portion of the frame in the closed position.

In some aspects, the frame includes a seal that engages a portion of the poppet in the closed position.

In another independent aspect, the disclosure provides a valve frame, a first axle, a plane, a second axle, a valve poppet, and a linkage system. The valve frame includes a valve seat and a pair of arms. The valve seat has an opening defined therein. The pair of arms extends from the valve seat. The first axle is coupled to each of the arms. The plane intersects each of the valve seat, the pair of arms, and the first axle. The second axle is spaced a distance from the first axle. The valve poppet is moveable along the plane between a closed position and an open position. The valve poppet sealingly engages the valve seat in the closed position. The linkage system is moveable with the valve poppet. The linkage system includes a first link and a second link. The first link is rotatably coupled to the first axle. The second link is rotatably coupled to the second axle. The second link is rotatably coupled to the first link at a connection. The connection travels away from the plane as the valve poppet moves toward the open position.

In some aspects, the connection travels arcuately about the first axle.

In some aspects, the plane further intersects the second axle.

In some aspects, each arm includes a guide rail defined by at least one surface of the arm, the valve poppet slidable relative to the guide rail.

In some aspects, the check valve assembly includes a pair of guide rails, each guide rail fixedly coupled to the valve poppet and slidably coupled to a respective arm

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof, as well as possible additional items. Unless specified or limited otherwise, the terms "mounted," "connected," "supported," and "coupled" and variations thereof are used broadly and encompass both direct and indirect mountings, connections, supports, and couplings.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4." The relative terminology may refer to plus or minus a percentage (e.g., 1%, 5%, 10%, or more) of an indicated value.

It is understood that terms such as "before" and "after" in the illustrated embodiment may be used to denote a specific point prior to and a specific point following, respectively, an event taking place. Alternatively, terms such as "before" and "after" may be used to denote the entirety of time prior to and the entirety of time following, respectively, an event taking place.

Figure 1:
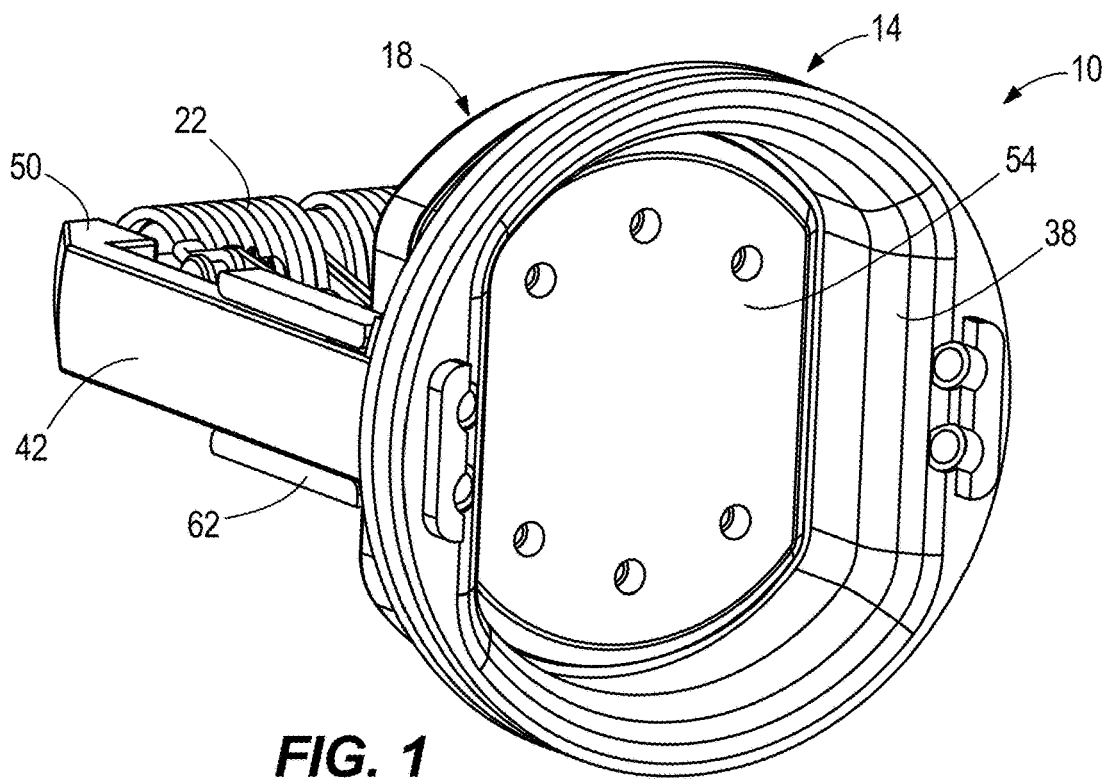
FIG. 1 is a front perspective view of a check valve assembly including a valve frame, a valve poppet, and a linkage system.
Figure 2:
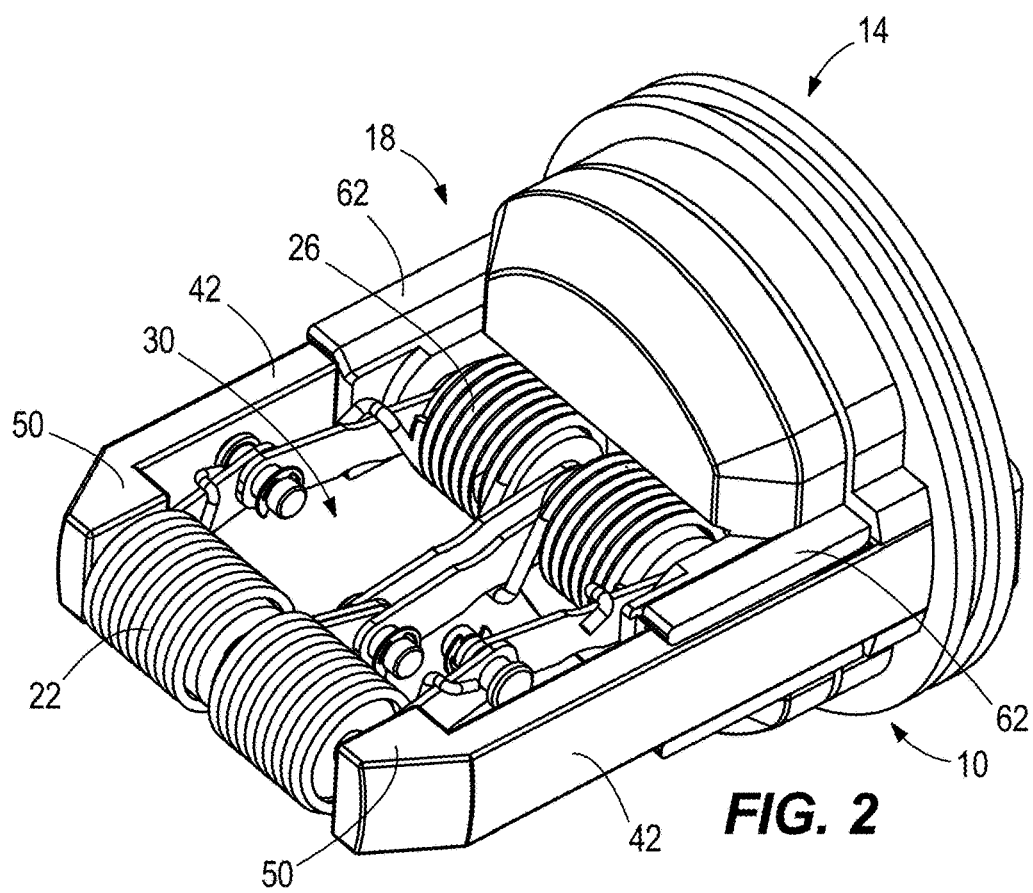
FIG. 2 is a rear perspective view of the check valve assembly of FIG. 1.

FIGS. 1 and 2 illustrate a check valve assembly 10. In the illustrated embodiment, the check valve assembly 10 is operable to move between an open position and a closed position in response to pressure buildup. As such, the check valve assembly 10 may be used to inhibit backflow in piping systems.

Figure 3:
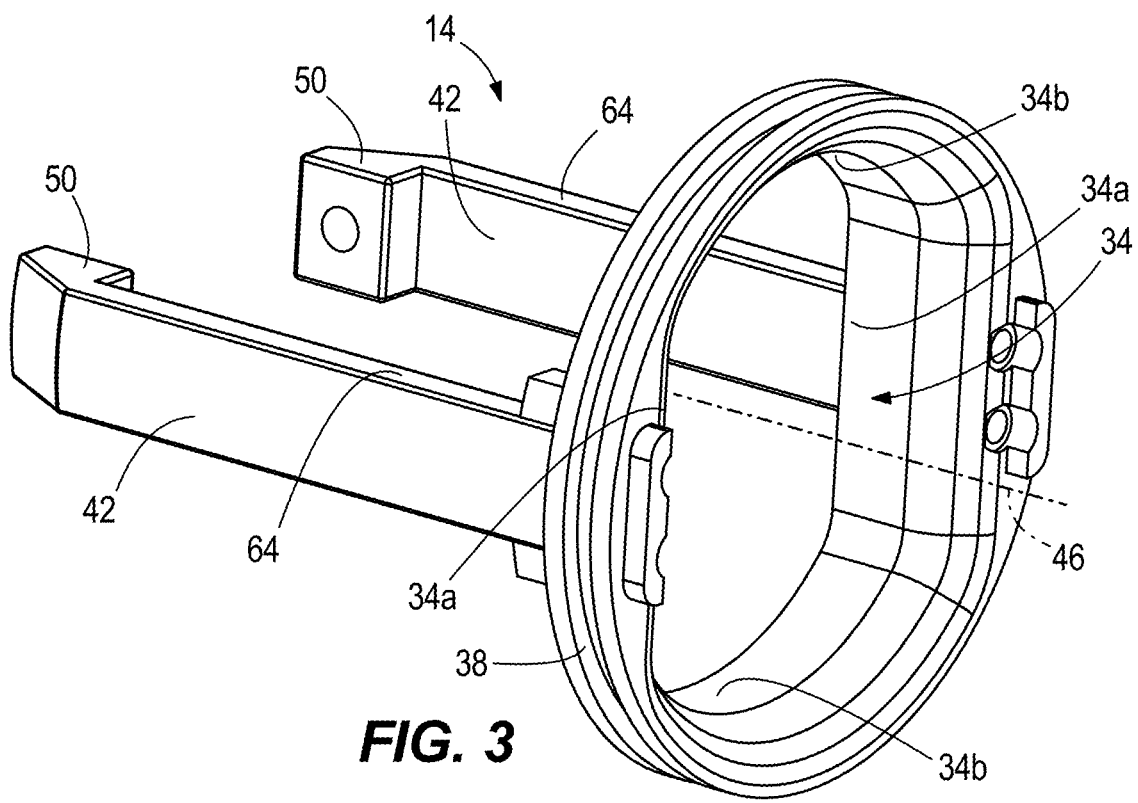
FIG. 3 is a perspective view of the valve frame of FIG. 1.

The illustrated check valve assembly 10 includes a valve frame 14, a valve poppet 18, a first torsion spring 22, a second torsion spring 26, and a linkage system 30. The valve frame 14 includes an opening 34, as best illustrated in FIG. 3. The valve poppet 18 is movable to open and to close the opening 34 in the valve frame 14. Each of the first torsion spring 22 and the second torsion spring 26 provide a corresponding bias on the valve poppet 18. The linkage system 30 mechanically links the first torsion spring 22 and the second torsion spring 26 to facilitate movement of the valve poppet 18 between the open position and the closed position.

As shown in FIG. 3, the valve frame 14 includes a valve seat 38 and a pair of arms 42 extending from the valve seat 38. The opening 34 is defined in the valve seat 38. In the illustrated embodiment, the opening 34 includes two linear edges 34a and two curved edges 34b. Each of the linear edges 34a is positioned across from the other of the linear edges 34a, and each of the curved edges 34b is positioned across from the other of the curved edges 34b. In other words, both of the curved edges 34b curve from one of the linear edges 34a to the other of the linear edges 34a. As such, the opening 34 has an oval shape. In other embodiments, the opening 34 may have a different shape, e.g., circular. The opening 34 defines a centerline 46 of the check valve assembly 10 (FIG. 1) therethrough. Each of the pair of arms 42 is positioned at a corresponding one of the linear edges 34a and extends away from the valve seat 38. Each of the pair of arms 42 includes an end portion 50 positioned opposite the valve seat 38. The end portion 50 turns inward towards the centerline 46 of the check valve assembly 10 (FIG. 1). In one configuration, the end portion 50 turns perpendicularly inward towards the centerline 46.

Figure 4:
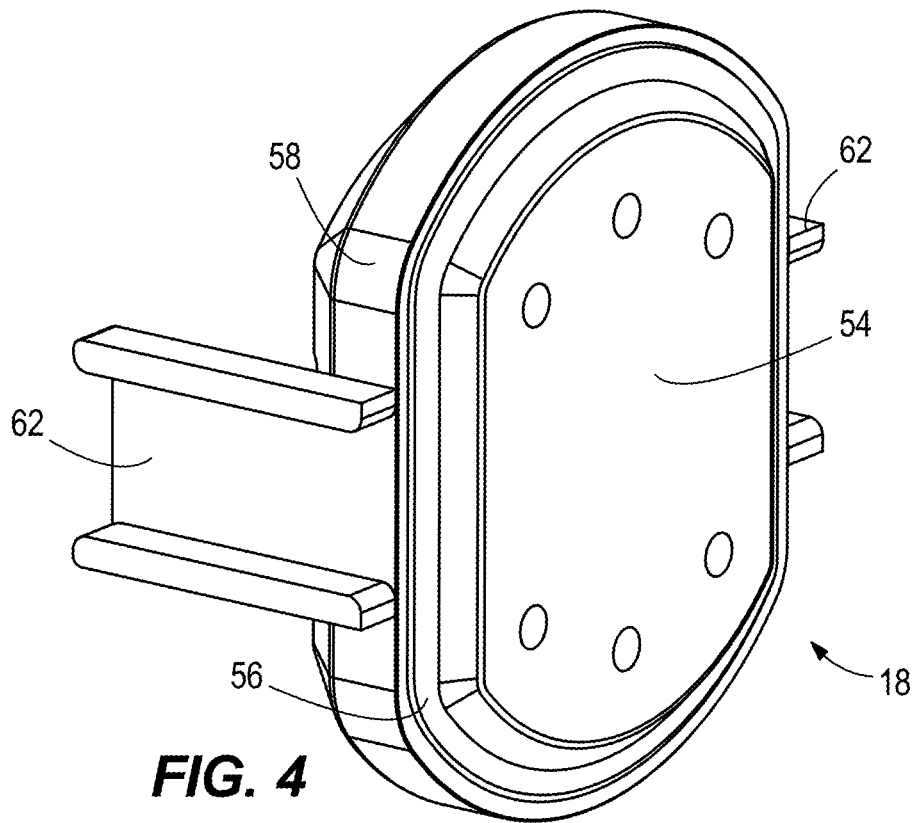
FIG. 4 is a perspective view of the valve poppet of FIG. 1.

FIG. 4 illustrates the valve poppet 18. The valve poppet 18 includes a valve poppet face 54, a seal 56, a valve poppet body 58, and a pair of valve poppet sliders 62. With additional reference to FIG. 3, the valve poppet face 54, the seal 56, and the valve poppet body 58 are received in the opening 34 of the valve frame 14 to close the check valve assembly 10 of FIG. 1. When the check valve assembly 10 is in the closed position, the valve poppet 18 seals the opening 34 to prohibit fluid from passing through the opening 34. In other words, the valve poppet 18 sealingly engages the valve seat 38 when the valve poppet 18 is in the closed position. Specifically, with reference to FIG. 3, the seal 56 is positioned on the valve poppet 18. The seal 56 engages each of the linear edges 34a and the curved edges 34b to seal the opening 34 of the valve frame 14. It is understood that although the valve poppet 18 seals the opening 34, some unintended leakage of fluid may still occur. In other embodiments, the seal 56 may be included in the valve frame 14 such that the poppet face 54 engages the seal 56 to seal the opening 34 of the valve frame 14. When assembled, each of the pair of valve poppet sliders 62 is positioned on a corresponding one of the pair of arms 42. Specifically, each of the pair of valve poppet sliders 62 is positioned on a surface 64 of the corresponding one of the pair of arms 42 such that the surface 64 defines a guide rail thereon. The pair of valve poppet sliders 62 facilitates sliding of the valve poppet 18 along the pair of arms 42 parallel to the centerline 46 of the check valve assembly 10.

Figure 5:
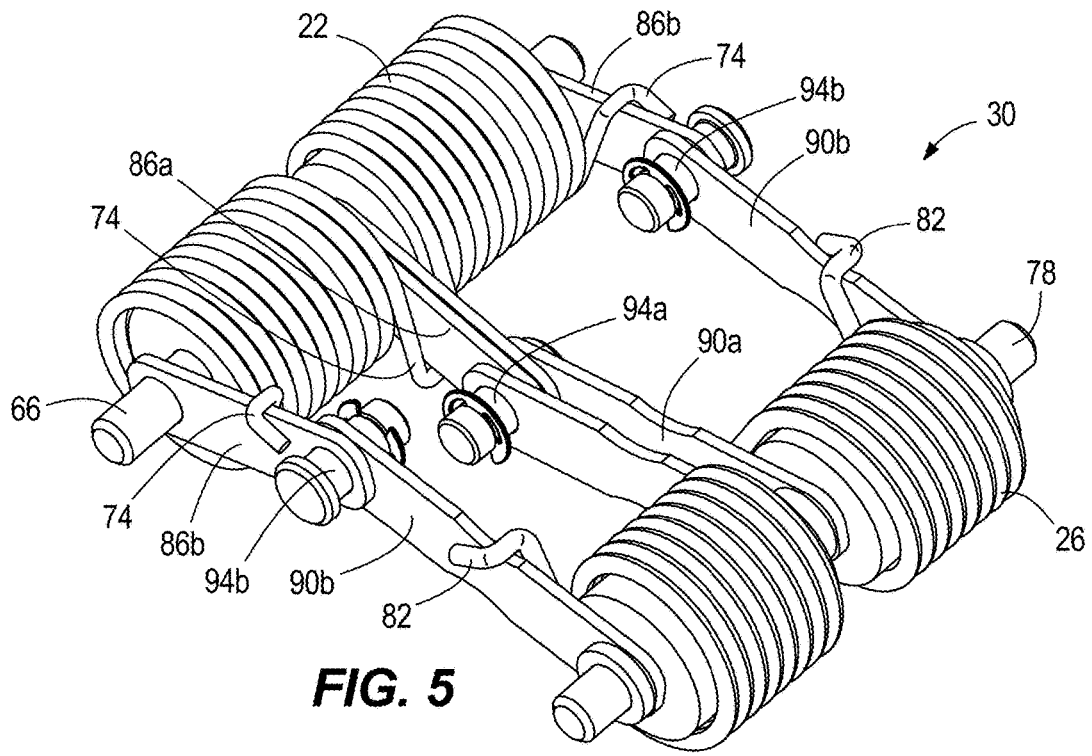
FIG. 5 is a perspective view of a first axle, a second axle, a first torsion spring, a second torsion spring, and the linkage system of FIG. 1.
Figure 6:
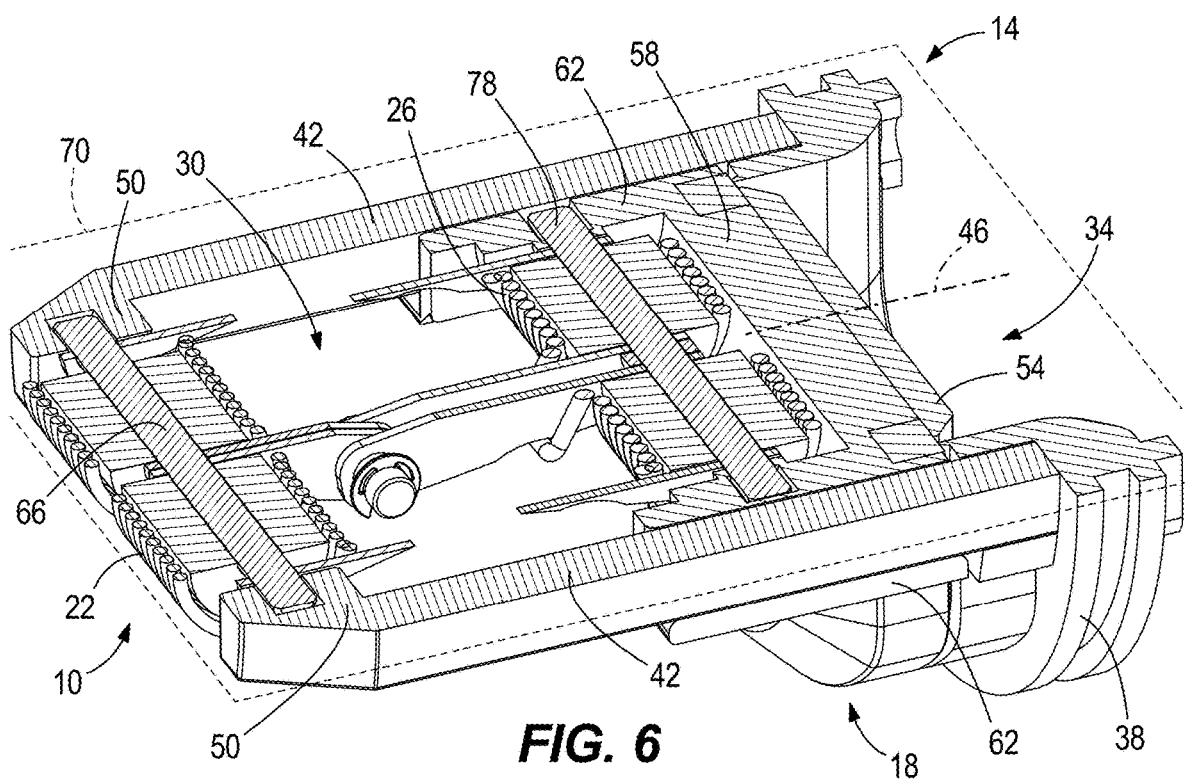
FIG. 6 is a cross-sectional view taken along the center of the check valve assembly of FIG. 1.

As illustrated in FIGS. 5 and 6, the first torsion spring 22 is positioned on the check valve assembly 10 opposite the opening 34 in the valve frame 14. Specifically, the first torsion spring 22 is supported by a first axle 66 on the check valve assembly 10. In other words, the first torsion spring 22 is disposed about the first axle 66. The first axle 66 extends between the end portions 50 of the pair of arms 42. The first axle 66 is fixed relative to the valve frame 14. The first axle 66, and thus the first torsion spring 22, is positioned such that a plane 70 intersects each of the valve seat 38, the pair of arms 42, and the first axle 66. Further, the centerline 46 of the check valve assembly 10 is positioned on the plane 70. The first torsion spring 22 includes a first plurality of legs 74. The first plurality of legs 74 engages the linkage system 30 such that the first torsion spring 22 is enabled to provide a bias on the linkage system 30. In the illustrated embodiment, the check valve assembly 10 includes just one first torsion spring 22. In other embodiments, the check valve assembly 10 may include a plurality of first torsion springs 22 disposed about the first axle 66.

In further embodiments, the plane 70 of the check valve assembly 10 may be oriented at an angle relative to the centerline 46 (for example, the plane 70 may be transverse relative to the centerline 46). For example, the pair of arms 42 may be inclined relative to the centerline 46 such that the plane 70 that intersects each of the valve seat 38, the pair of arms 42, and the first axle 66 is not perpendicular to the valve poppet face 54. In such embodiments, the valve poppet face 54 moves between the closed position and the open position in a direction that is not parallel to the centerline 46. As such, the valve poppet face 54 would move slightly out of a flow path through the opening 34, thereby reducing pressure losses through the check valve assembly 10.

The second torsion spring 26 is positioned on the valve poppet body 58. Specifically, the second torsion spring 26 is supported by a second axle 78 on the valve poppet body 58. In other words, the second torsion spring 26 is disposed about the second axle 78. The second axle 78 extends through the valve poppet body 58 parallel to the first axle 66 (i.e., perpendicular to the centerline 46). The second axle 78 is fixed relative to the valve poppet 18. The second axle 78 is spaced a distance from the first axle 66. The second axle 78 is positioned such that the plane 70 that intersects each of the valve seat 38, the pair of arms 42, and the first axle 66 additionally intersects the second axle 78. The second torsion spring 26 includes a second plurality of legs 82. The second plurality of legs 82 engages the linkage system 30 such that the second torsion spring 26 is enabled to provide a bias on the linkage system 30. In the illustrated embodiment, the check valve assembly 10 includes just one second torsion spring 26. In other embodiments, the check valve assembly 10 may include a plurality of second torsion springs 26 disposed about the second axle 78.

With continued reference to FIGS. 5 and 6 the linkage system 30 includes a first link 86a, 86b and a second link 90a, 90b. The first link 86a, 86b is rotatably coupled to the first axle 66. The second link 90a, 90b is rotatably coupled to the second axle 78. Further, the second link 90a, 90b is rotatably coupled to the first link 86a, 86b opposite the second axle 78. The first link 86a, 86b and the second link 90a, 90b are rotatably coupled at a connection 94a, 94b. In the illustrated embodiment, the first link 86a, 86b is shorter in length than the second link 90a, 90b. In other embodiments, the first link 86a, 86b and the second link 90a, 90b may have equal lengths. In further embodiments, the first link 86a, 86b may have a greater length than the second link 90a, 90b.

The first link 86a, 86b is one of a plurality of first links 86a, 86b, and the second link 90a, 90b is one of a plurality of second links 90a, 90b. More specifically, the linkage system 30 includes a middle first link 86a and two outer first links 86b. Each of the two outer first links 86b is positioned on a corresponding side of the middle first link 86a. The linkage system 30 further includes a middle second link 90a and two outer second links 90b. The middle second link 90a is rotatably coupled to the middle first link 86a at a middle connection 94a. Each of the two outer second links 90b is coupled to a corresponding outer first link 86b at outer connections 94b.

Each of the first plurality of legs 74 may engage and bias a corresponding one of the middle first link 86a and the two outer first links 86b. Each of the second plurality of legs 82 may engage and bias a corresponding one of the middle second link 90a and the two outer second links 90b. The linkage system 30 is configured within the check valve assembly 10 to move with the valve poppet 18. As such, the bias provided by the first plurality of legs 74, and thus the first torsion spring 22, and the second plurality of legs 82, and thus the second torsion spring 26, on the linkage system 30 moves the linkage system 30 and the valve poppet 18.

Figure 7:
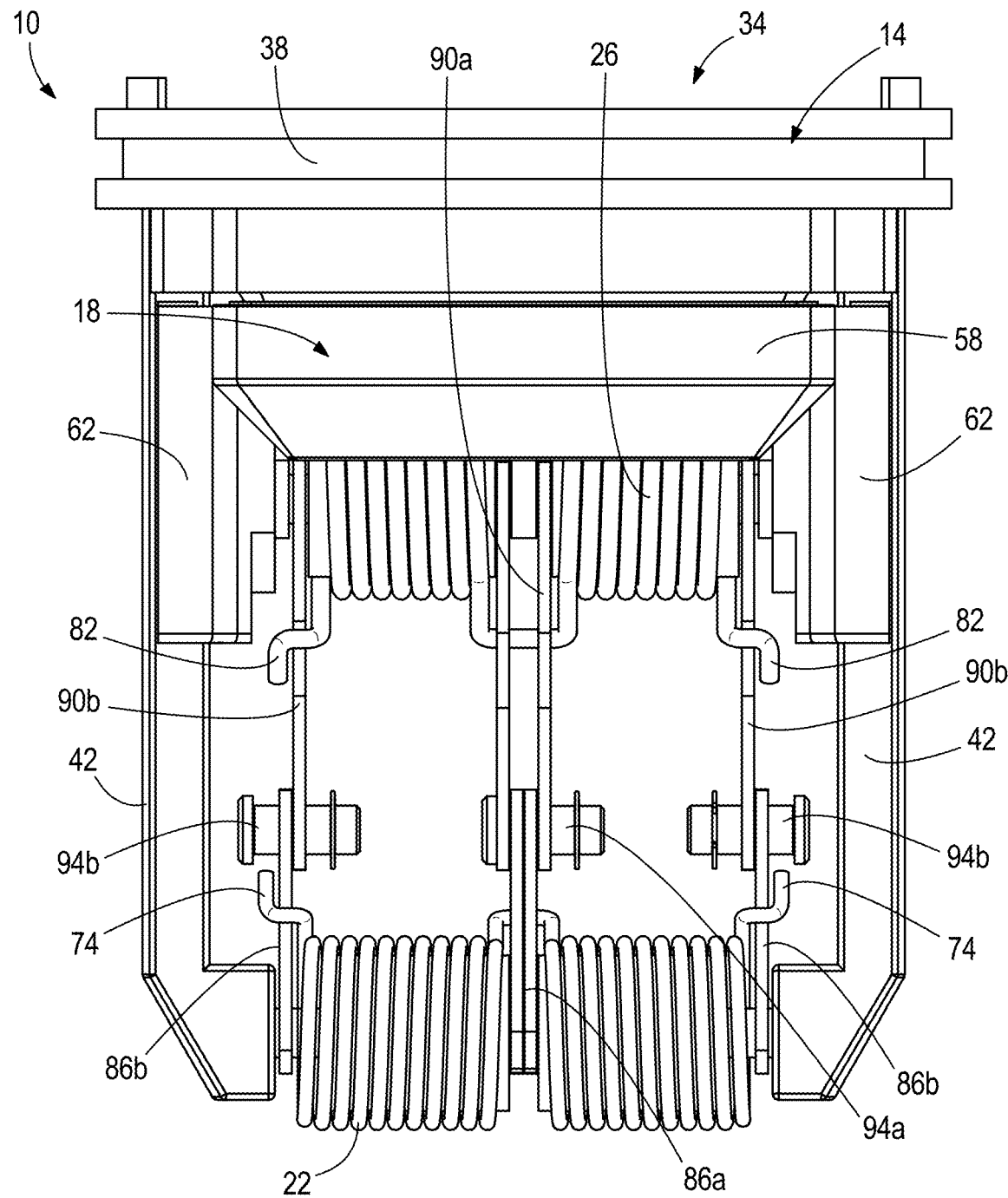
FIG. 7 is a top view of the check valve assembly of FIG. 1.

With reference to FIG. 7, in operation, the check valve assembly 10 may be installed in a piping system (not shown) for transporting fluid. The valve poppet 18 is operable to move away from the valve seat 38 from a closed position to an open position of which further detail will be disclosed below.

Figure 8:
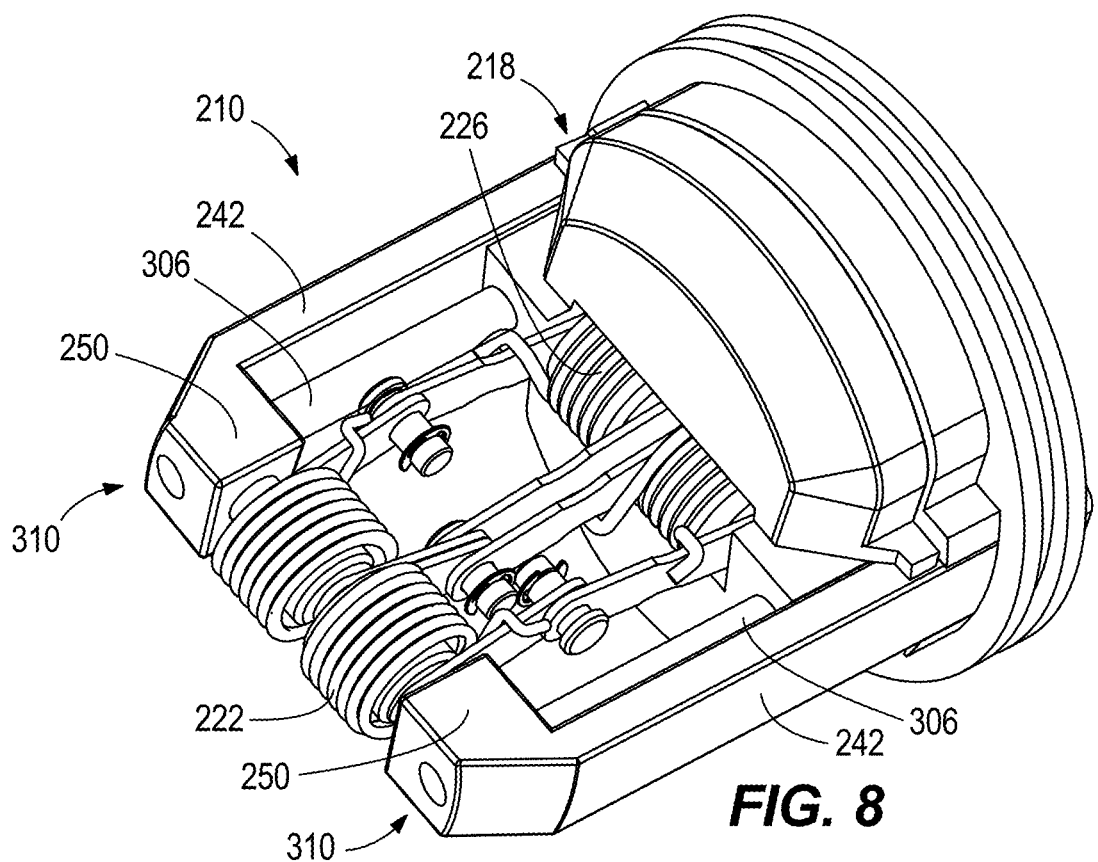
FIG. 8 is a perspective view of another check valve assembly.
Figure 9:
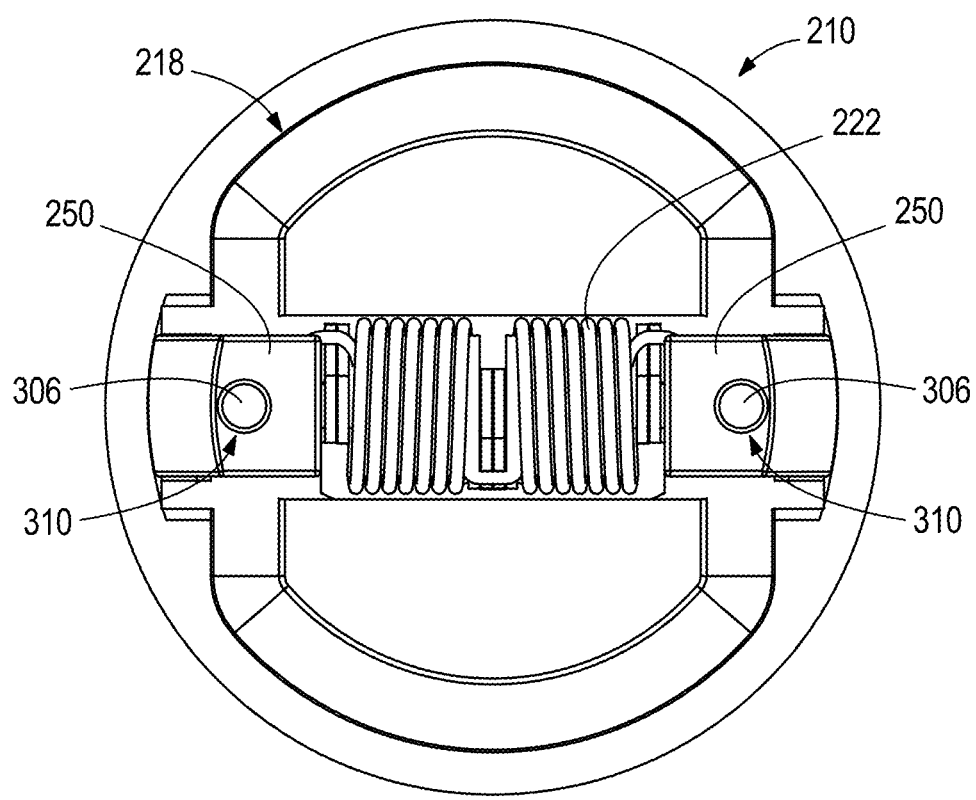
FIG. 9 is a rear view of the check valve assembly of FIG. 8.

FIGS. 8 and 9 illustrate another check valve assembly 210 according to embodiments disclosed herein. Many components of the illustrated check valve assembly 210 are similar to the check valve assembly 10 described above with reference to FIGS. 1-7. As such, like parts have been given like reference numbers, increased by a value of two hundred. For the sake of brevity, only the differences between the check valve assemblies 10, 210 are explained below.

The check valve assembly 210 includes a first torsion spring 222 and a second torsion spring 226 that are generally smaller than the first torsion spring 22 and the second torsion spring 26 of FIGS. 1-7. As such, the first torsion spring 222 and the second torsion spring 226 provide extra space in the check valve assembly 210 for a pair of guide bars 306. Each guide bar 306 is fixedly coupled to a valve poppet 218. As the valve poppet 218 moves from a closed position to an open position, the pair of guide bars 306 slide through a corresponding aperture 310 defined in end portions 250 of each of the pair of arms 242. As such, the engagement between the pair of guide bars 306 and the pair of arms 242 aids in facilitating linear sliding of the valve poppet 218. As such, the pair of guide bars 306 define a guide rail for the valve poppet 218.

Figure 10:
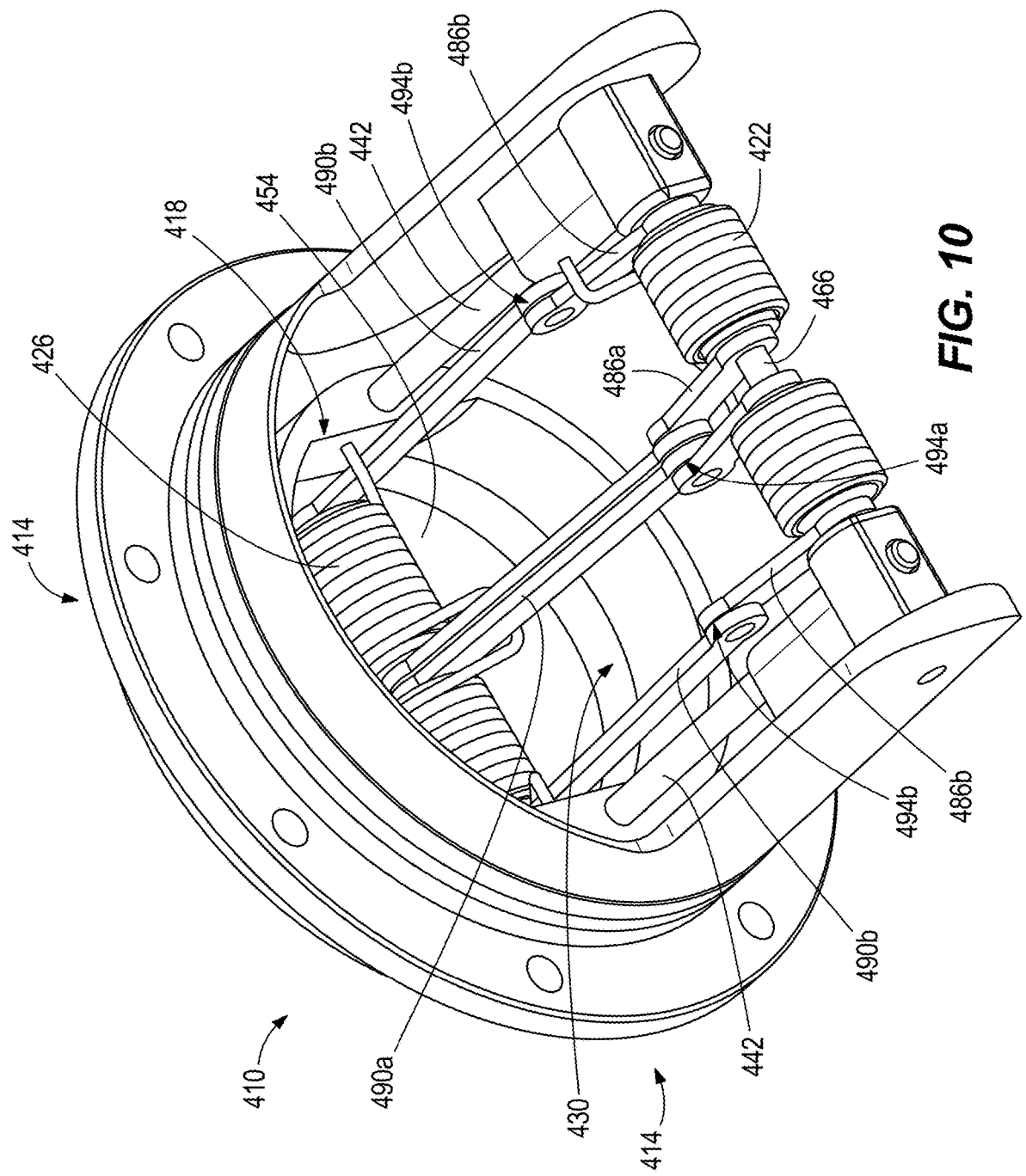
FIG. 10 is a rear perspective view of another check valve assembly.

FIG. 10 illustrates another check valve assembly 410 according to additional embodiments disclosed herein. Many components of the illustrated check valve assembly 410 are similar to the check valve assembly 10 described above with reference to FIGS. 1-7, and the check valve assembly 210 described above with reference to FIGS. 8 and 9. As such, like parts have been given like reference numbers, increased by a value of four hundred and two hundred, respectively. For the sake of brevity, only the differences between the check valve assemblies 10, 210, 410 are explained below.

Figure 11A:
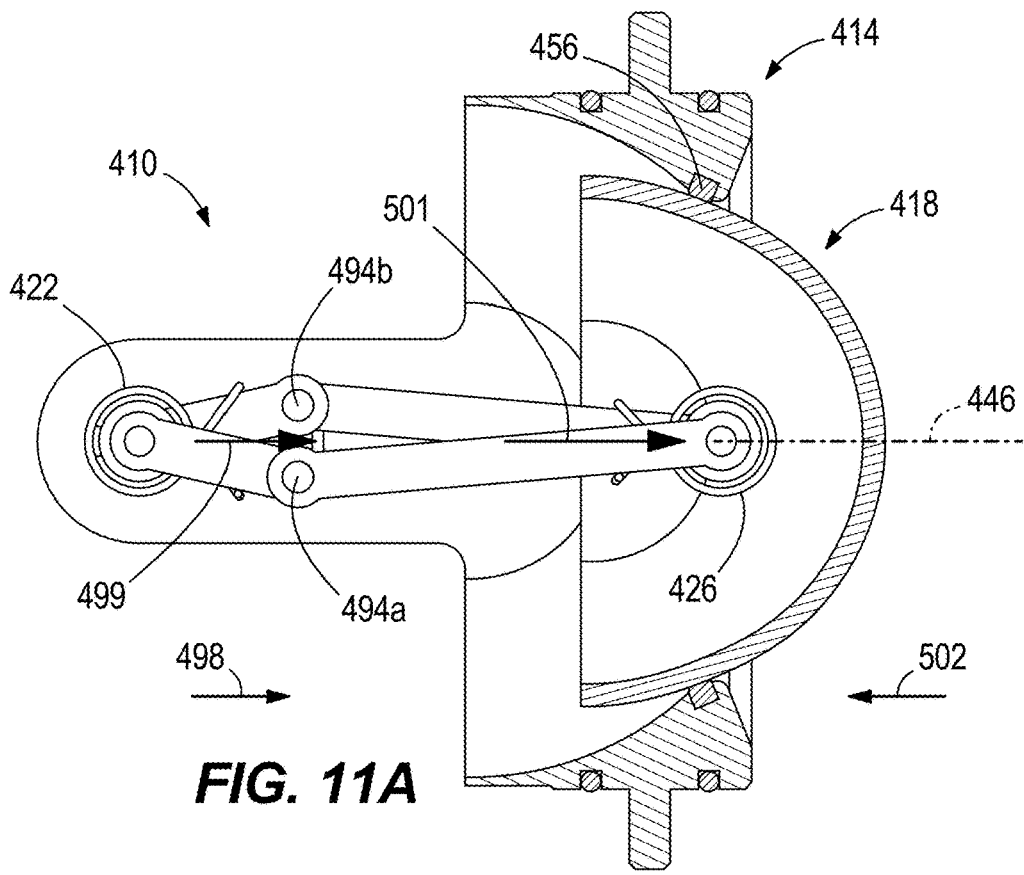
FIG. 11A is a side view of the check valve assembly of FIG. 10 in a first position.

The check valve assembly 410 includes a valve poppet 418 having a dome-shaped valve poppet face 454. Additionally, the check valve 410 includes a valve frame 414 having an opening 434. The curvature of the dome shape facilitates closing of the opening 434. The valve frame 414 may include a dome-shaped structure to guide the dome shape of the valve poppet face 454 into the opening 434 to seal the opening 434. As best illustrated in FIG. 11A, the valve frame 414 includes a seal 456 positioned at an inner periphery of the valve frame 414 that defines the opening 434. The dome-shaped valve poppet face 454 engages the seal 456 to close the check valve assembly 410.

Figure 11B:
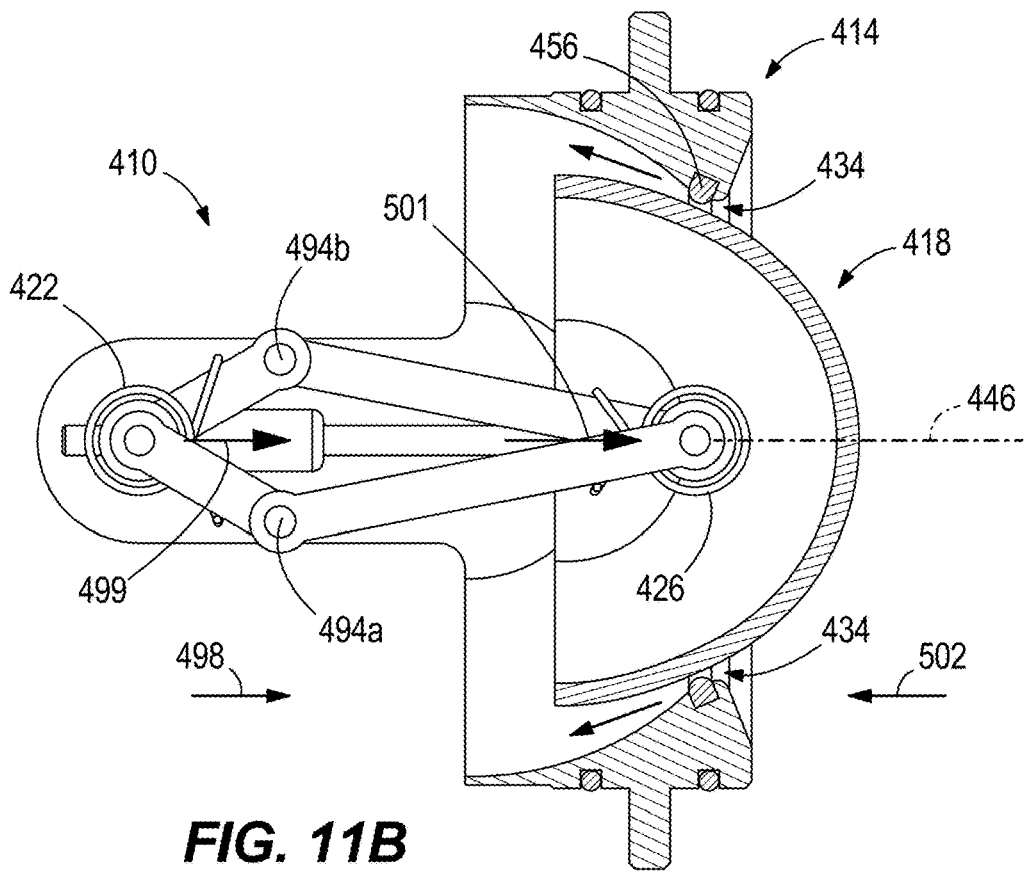
FIG. 11B is a side view of the check valve assembly of FIG. 10 moving from the first position to a second position.

The operation of the check valve assemblies 10, 210, 410 described here below applies equally to each of the check valve assemblies 10, 210, 410. Although the operation is described with reference to the check valve assembly 410 as illustrated in FIGS. 10-11D, it is understood that that the disclosure of the operation of the check valve assemblies 10, 210, 410 is not limited to the embodiment shown in FIGS. 10-11D. As such, the operation of the components described below with respect to the check valve assembly 410 applies equally to the operation of the components of the check valve assembly 210 minus two hundred and to the operation of the components of the check valve assembly 10 minus 400.

With reference to FIG. 11A, when a fluid is not present or is present but below a threshold pressure level at the opening 434 (the opening 434 being best illustrated in FIG. 11D) in the valve frame 414, each of the first torsion spring 422 and the second torsion spring 426 bias the valve poppet 418 in a first direction 498 (i.e., a closing direction parallel to the centerline 446), and the valve poppet 418 remains in the closed position. As such, the bias of the first torsion spring 422 provides a first resultant force 499 on the linkage system 430 (FIG. 10), and the bias of the second torsion spring 426 provides a second resultant force 501 on the linkage system 430 (FIG. 10). As shown in FIG. 11B, once enough fluid is present at the opening 434 such that the pressure at the opening 434 is above a threshold pressure level, the valve poppet 418 begins to move in a second direction 502 (i.e., an opening direction) along the centerline 446. The second direction 502 is opposite the first direction 498. The second direction 502 is parallel to the centerline 446. As the valve poppet 418 begins to move in the second direction 502, the first resultant force 499 and the second resultant force 501 begin to fluctuate, as will be described in more detail below.

Figure 12:
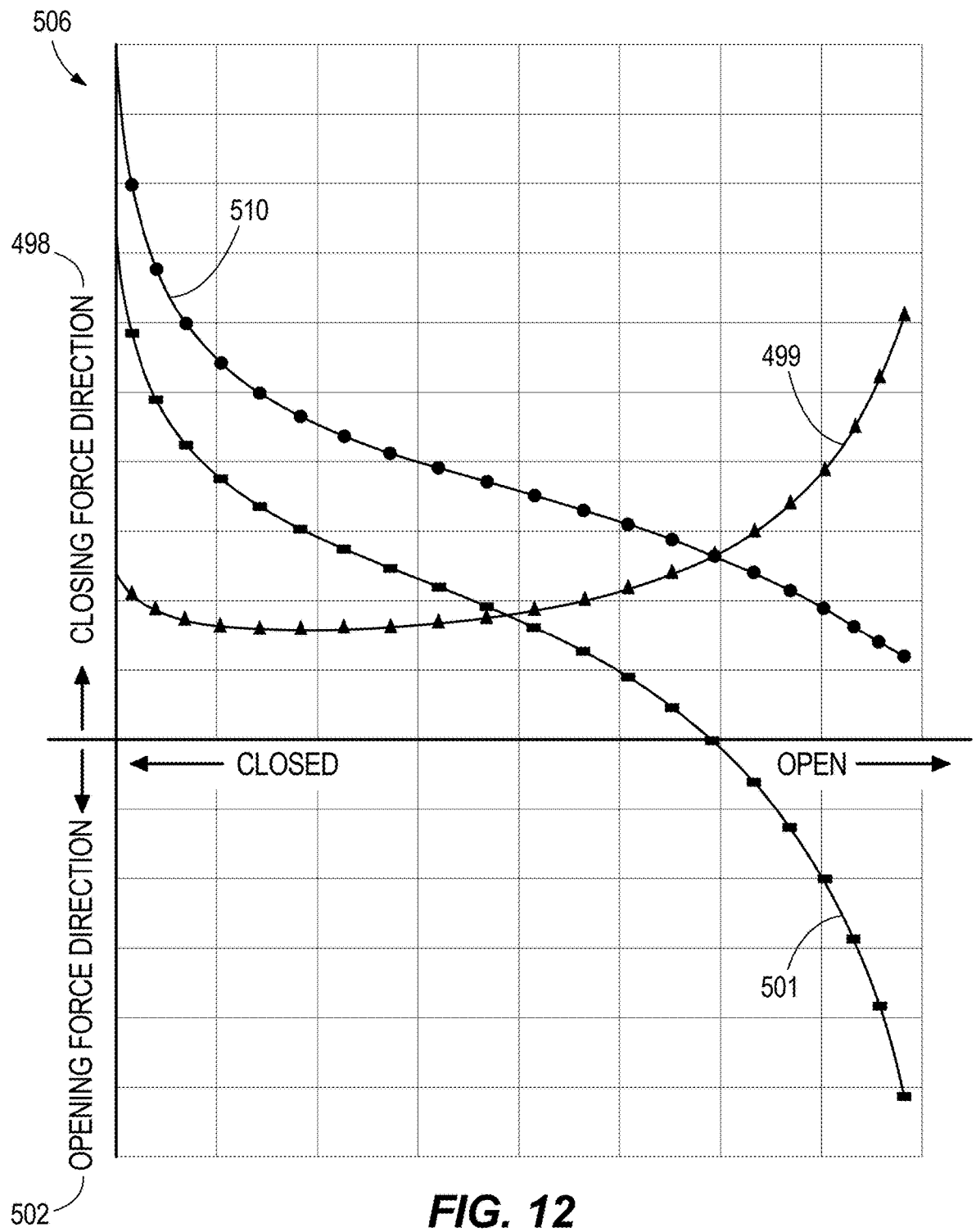
FIG. 12 is a graph illustrating force vs. movement of a valve poppet.

FIG. 12 illustrates a force graph 506. The force graph 506 illustrates force magnitude (i.e., y-axis) versus movement (x-axis) of the valve poppet 418 (FIG. 11A) between the closed position and the open position. Specifically, the force graph 506 plots the first resultant force 499, the second resultant force 501, and a total force 510 of the first resultant force 499 and the second resultant force 501 as the valve poppet 418 moves between the closed position and the open position. With additional reference to FIG. 11A, when the valve poppet 418 is closed, the magnitude of the second resultant force 501, applied by the second torsion spring 426 in the first direction 498, is greater than the magnitude of the first resultant force 499, applied by the first torsion spring 422 in the first direction 498. As the valve poppet 418 begins to move in the second direction 502, as illustrated in FIG. 11B, the magnitude of both the first resultant force 499 and the second resultant force 501 begin to decrease in the first direction 498. Specifically, the magnitude of the first resultant force 499 decreases slightly, becomes substantially constant, and then begins to increase in the first direction 498 while the magnitude of the second resultant force 501 continually decreases in the first direction 498. Eventually, the magnitude of the second resultant force 501, in the first direction 498, becomes less than the magnitude of the first resultant force 499 in the first direction 498.

Figure 11C:
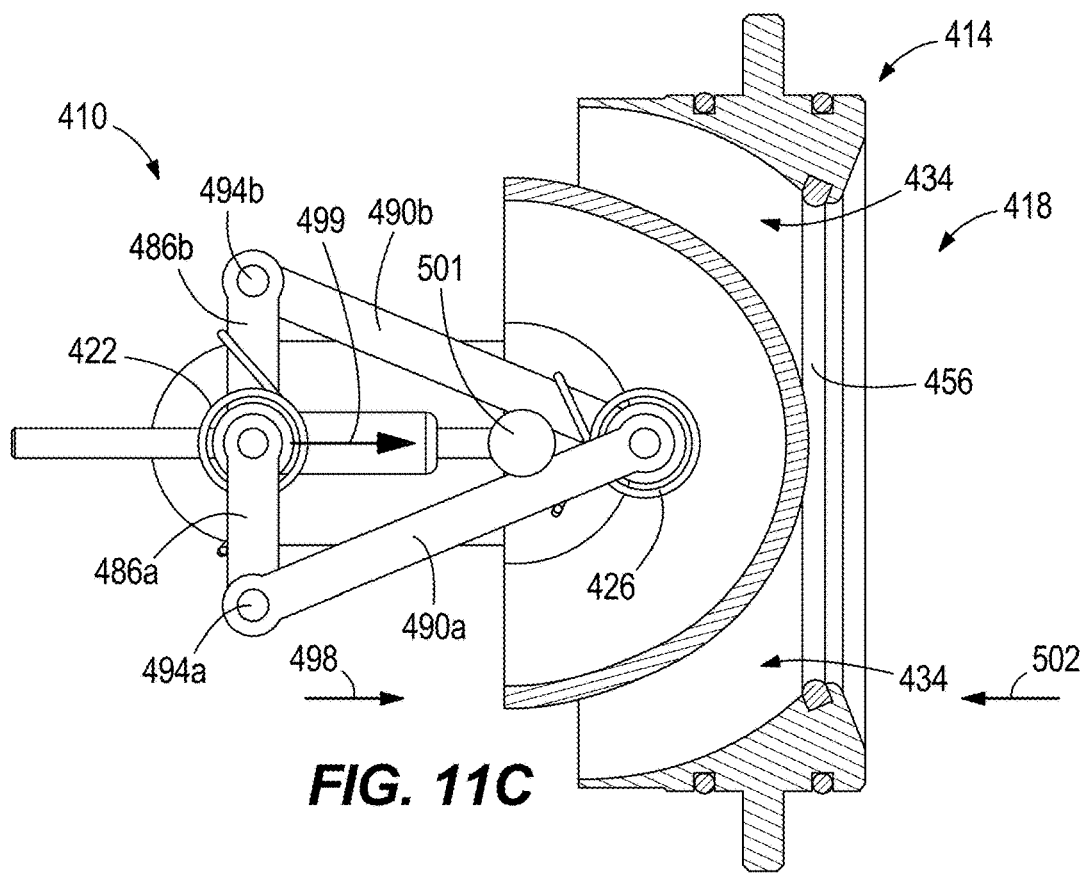
FIG. 11C is another side view of the check valve assembly of FIG. 10 moving from the first position to the second position.
Figure 11D:
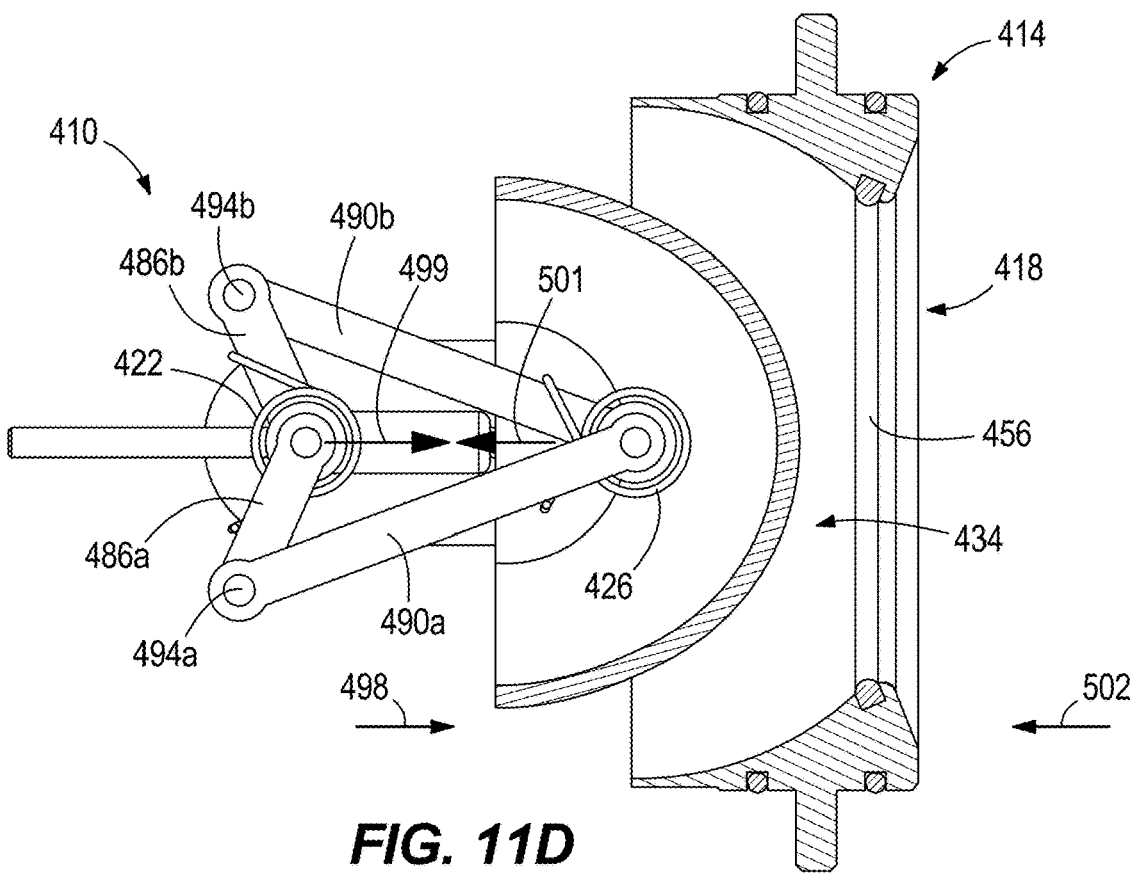
FIG. 11D is a side view of the check valve assembly of FIG. 10 in the second position.

As illustrated in FIG. 11C, once the valve poppet 418 has traveled a threshold distance in the second direction 502, the second resultant force 501 is minimized. More specifically, the second torsion spring 426 provides no second resultant force 501 on the linkage system 430 (FIG. 10) at the threshold distance. With reference to FIG. 12. the first resultant force 499 provided by the first torsion spring 422 continues to increase in the first direction 498 while the second resultant force 501 decreases in the first direction 498 to reach the horizontal axis, that is, the zero force magnitude axis, of the force graph 506. Returning reference to FIG. 11C, the threshold distance is defined as the point between the closed position and the open position in which the first links 486*a*, 486*b* extend substantially perpendicularly to the centerline 446. Therefore, the threshold distance is dependent on the arcuate distance the first links 486*a*, 486*b* travel from the closed position to a position substantially perpendicular to the centerline 446 at the threshold distance. As such, the threshold distance is dependent on the lengths of the first links 486*a*, 486*b*. The threshold distance may also be dependent on the lengths of the second links 490*a*, 490*b*.

As the valve poppet 418 moves past the threshold distance, the second torsion spring 426 begins to provide the second resultant force 501 in the second direction 502 while the first resultant force 499 provided by the first torsion spring 422 continues to increase in the first direction 498. The valve poppet 418 then reaches the open position, as shown in FIG. 11D, in which the valve poppet 418 has traveled the maximum possible distance in the second direction 502. As such, the total force 510 continually decreases as the valve poppet 418 moves from the closed position to the open position. Specifically, the second resultant force 501 continually decreases at a greater rate than the rate of change of the first resultant force 499 such that the total force 510 continually decreases. Although the fluctuations of the first resultant force 499, the second resultant force 501, and the total force 510 are illustrated in FIG. 12, the components of the check valve assembly 410 such as spring load, spring rate, linkage lengths, and the like, are directly related to the first resultant force 499, the second resultant force 501, and the total force 510. Therefore, altering any such component directly affects and alters the magnitude and direction, and thus the plot, of the first resultant force 499, the second resultant force 501, and the total force 510.

With reference to FIGS. 11D and 12, at the open position, the second resultant force 501 provided by the second torsion spring 426 in the second direction 502 is weaker than the first resultant force 499 provided by the first torsion spring 422 in the first direction 498. As such, once the fluid is no longer present at the opening 434, the first resultant force 499 provided by the first torsion spring 422 begins to move the valve poppet 418 back in the first direction 498 toward the opening 434. The valve poppet 418 then travels past the threshold point in the first direction 498 such that the second torsion spring 426 begins to bias the valve poppet 418 in the first direction 498 again (i.e., provide the second resultant force 501 in the first direction 498 again). Finally, the first torsion spring 422 and the second torsion spring 426 bias the valve poppet 418 to the closed position in which the valve poppet 418 seals the opening 434 in the valve frame 14 (FIG. 11A).

As illustrated in FIG. 10, as the valve poppet 418 moves between the closed position (FIG. 11A) and the open position (FIG. 11B), each of the middle connection 494a and the outer connections 494b moves arcuately to facilitate linear movement of the valve poppet 418. Specifically, each of the middle connection 494a and the outer connections 494b moves arcuately about the first axle 466. As illustrated in FIG. 11A, in the closed position, the middle connection 494a is positioned below the centerline 446, and the outer connections 494b are positioned above the centerline 446. With reference to the check valve assembly 10 of FIGS. 1-7, and more specifically with reference to FIG. 6, the middle connection 94a is positioned below the plane 70, and the outer connections 94b are position above the plane 70. Returning reference to FIG. 10, as the valve poppet 418 moves from the closed position (FIG. 11A) to the open position (FIG. 11B), an elongated guide rail 442 constrains the motion of the middle connection 494a and the outer connections 494b such that the middle connection 494a and the outer connections 494b travel arcuately away from the centerline 446 (FIGS. 11B and 11C) as the first torsion spring 422 and the second torsion spring 426 bias the linkage system 430. With reference to FIG. 11C, as the valve poppet 418 reaches the threshold distance, the middle connection 494a is positioned below the first torsion spring 422 and in axial alignment along the centerline 446 with the first torsion spring 422. Additionally, the outer connections 494b are positioned above the first torsion spring 422 and in axial alignment along the centerline 446 with the first torsion spring 422. As the valve poppet 418 moves past the first torsion spring 422, the connections 494a, 494b travel past the first torsion spring 422.

Although movement of the poppet 418 is described with reference to each of the middle connection 94a and the two outer connections 94b, the check valve assembly 410 may include just one of the middle connection 94a and the two outer connections 94b for enabling motion of the poppet head 418. Specifically, in some embodiments, the check valve assembly 410 may include just the middle connection 94a. In other embodiments, the check valve assembly 410 may include just the two outer connections 94b. In further embodiments, the check valve assembly 410 may include just one of the two outer connections 94b.

Returning reference to FIG. 10, in absence of the second torsion spring 426, the first torsion spring 422 would bias the first links 486a, 486b into alignment with the centerline 446. In absence of the first torsion spring 422, the second torsion spring 426 would also bias the second links 490a, 490b into alignment with the centerline 446. As such, the connections 494a, 494b prevent the first links 486a, 486b and the second links 490a, 490b from directly aligning with the centerline 446. Therefore, the connections 494a, 494b between the first links 486a, 486b and the second links 490a, 490b further facilitate arcuate movement of the first links 486a, 486b and the second links 490a, 490b as the valve poppet 418 moves between the closed position and the open position.

It will be understood that certain features and sub combinations are of utility and may be employed without reference to other features and sub combinations. Features described and illustrated with respect to certain embodiments may also be implemented in other embodiments. This is contemplated by and is within the scope of the claims. Since other possible embodiments of the disclosure may be made without departing from the scope thereof, it is understood that examples herein described or shown in the accompanying drawings are to be interpreted as illustrative and are not intended to limit the concepts and principles of the present disclosure. Many changes, modifications, variations and other uses and applications of the illustrated examples will become apparent to those skilled in the art after considering the specification and the accompanying drawings. Such changes, modifications, variations and other uses and applications are deemed to be covered by the disclosure. Various features and aspects are set forth in the following claims.

What is claimed is:

1. A check valve assembly comprising:
a valve frame having an opening;
a valve poppet positionable in the opening, the valve poppet linearly moveable in a first direction to close the check valve assembly and in a second direction to open the check valve assembly;
a first torsion spring biasing the valve poppet in the first direction; and
a second torsion spring biasing the valve poppet in the first direction before the valve poppet has traveled a threshold distance, the second torsion spring biasing the valve poppet in the second direction after the valve poppet has traveled the threshold distance.

2. The check valve assembly of claim 1, wherein the valve poppet has a dome-shaped sealing face.

3. The check valve assembly of claim 1, wherein the second torsion spring does not bias the valve poppet with the valve poppet at the threshold distance.

4. The check valve assembly of claim 1, wherein the valve frame includes an elongated guide rail extending in a direction parallel to the first direction and the second direction, the valve poppet slidably coupled to the elongated guide rail.

5. The check valve assembly of claim 1 further comprising a plurality of links connecting the valve poppet to the valve frame, the threshold distance dependent on a length of each link.

6. The check valve assembly of claim 1, wherein the first direction is opposite the second direction.

7. A check valve assembly comprising:
a frame having an opening defining a centerline of the check valve assembly;
a poppet moveable from an open position toward a closed position in a first direction along the centerline, the poppet moveable from the closed position toward the open position in a second direction along the centerline;
a first axle extending transverse to the first direction;
a first torsion spring disposed about the first axle;
a second axle extending transverse to the first direction, the second axle spaced a distance from the first axle;
a second torsion spring disposed about the second axle; and
a linkage system moveable with the poppet, the linkage system including
a first link rotatably coupled to the first axle, and
a second link rotatably coupled to the second axle, the second link rotatably coupled to the first link at a connection;
wherein moving the poppet in the second direction toward the open position includes moving the connection arcuately about the first axle and along the second direction.

8. The check valve assembly of claim 7, wherein each of the first direction and the second direction is parallel to the centerline.

9. The check valve assembly of claim 7, wherein each of the first direction and the second direction is transverse to the centerline.

10. The check valve assembly of claim 7, wherein the first axle is fixed relative to the frame.

11. The check valve assembly of claim 7, wherein the second axle is fixed relative to the poppet.

12. The check valve assembly of claim 7, wherein the first link is one of a plurality of first links, the second link is one of a plurality of second links, and each second link is rotatably coupled to a respective first link at a corresponding connection.

13. The check valve assembly of claim 7, wherein a leg of the first torsion spring engages the first link, and a leg of the second torsion spring engages the second link.

14. The check valve assembly of claim 7, wherein the poppet has a dome-shaped sealing face.

15. The check valve assembly of claim 7, wherein the frame includes an elongated guide rail extending in a direction parallel to the first direction and the second direction, the poppet slidably coupled to the elongated guide rail.

16. The check valve assembly of claim 7, wherein
the first torsion spring biases the poppet in the first direction,
the second torsion spring biases the poppet in the first direction before the poppet has traveled a threshold distance, and
the second torsion spring biases the poppet in the second direction after the poppet has traveled the threshold distance.

17. The check valve assembly of claim 7, wherein the poppet includes a seal that engages a portion of the frame in the closed position.

18. The check valve assembly of claim 7, wherein the frame includes a seal that engages a portion of the poppet in the closed position.

19. A check valve assembly comprising:
a valve frame including
a valve seat having an opening defined therein, and
a pair of arms extending from the valve seat;
a first axle coupled to each of the arms;
a plane intersecting each of the valve seat, the pair of arms, and the first axle;
a second axle spaced a distance from the first axle;
a valve poppet moveable along the plane between a closed position and an open position, the valve poppet sealingly engaging the valve seat in the closed position; and
a linkage system moveable with the valve poppet, the linkage system including
a first link rotatably coupled to the first axle, and
a second link rotatably coupled to the second axle, the second link rotatably coupled to the first link at a connection, the connection traveling away from the plane as the valve poppet moves toward the open position.

20. The check valve assembly of claim 19, wherein the connection travels arcuately about the first axle.

21. The check valve assembly of claim 19, wherein the plane further intersects the second axle.

22. The check valve assembly of claim 19, wherein each arm includes a guide rail defined by at least one surface of the arm, the valve poppet slidable relative to the guide rail.

23. The check valve assembly of claim 19, further comprising a pair of guide rails, each guide rail fixedly coupled to the valve poppet and slidably coupled to a respective arm.

* * * * *